United States Patent

Wehler et al.

Patent Number: 5,422,157
Date of Patent: * Jun. 6, 1995

[54] GUIDE CHANNEL FOR RECEIVING AND GUIDING GUIDE CHAINS FOR ENERGY LINES

[75] Inventors: Herbert Wehler, Heinrichsglückerweg; Willibald Weber, Auf dem Garten, both of Germany

[73] Assignee: Kabelschlepp Gesellschaft mit beschränkter Haft, Siegen, Germany

[*] Notice: The portion of the term of this patent subsequent to Nov. 2, 2010 has been disclaimed.

[21] Appl. No.: 989,065

[22] Filed: Dec. 11, 1992

[30] Foreign Application Priority Data

Dec. 12, 1991 [DE] Germany ............... 41 40 909.4

[51] Int. Cl.6 .................................... F16H 7/18
[52] U.S. Cl. ............................. 428/122; 474/144
[58] Field of Search ............. 428/122, 358; 474/144, 474/146

[56] References Cited

U.S. PATENT DOCUMENTS

| | | | |
|---|---|---|---|
| 2,912,882 | 11/1959 | Wilson | 474/144 |
| 3,343,880 | 9/1967 | Hauschopp | 474/146 X |
| 3,481,812 | 12/1969 | Holub et al. | 428/441 X |
| 4,659,029 | 4/1987 | Rodriguez | 428/295 X |
| 5,257,961 | 11/1993 | Wehler et al. | 474/144 |

FOREIGN PATENT DOCUMENTS 3300495  1/1983  Germany .
2129466  5/1984  United Kingdom .

Primary Examiner—Henry F. Epstein
Attorney, Agent, or Firm—Robert W. Becker & Associates

[57] ABSTRACT

A guide channel for receiving and guiding a guide chain for energy lines has a bottom and two sidewalls. In order to provide a lightweight and noise-reducing guide channel that is easily assembled, the sidewalls are made of a composite material that includes thin cover plates and an elastic core.

7 Claims, 3 Drawing Sheets

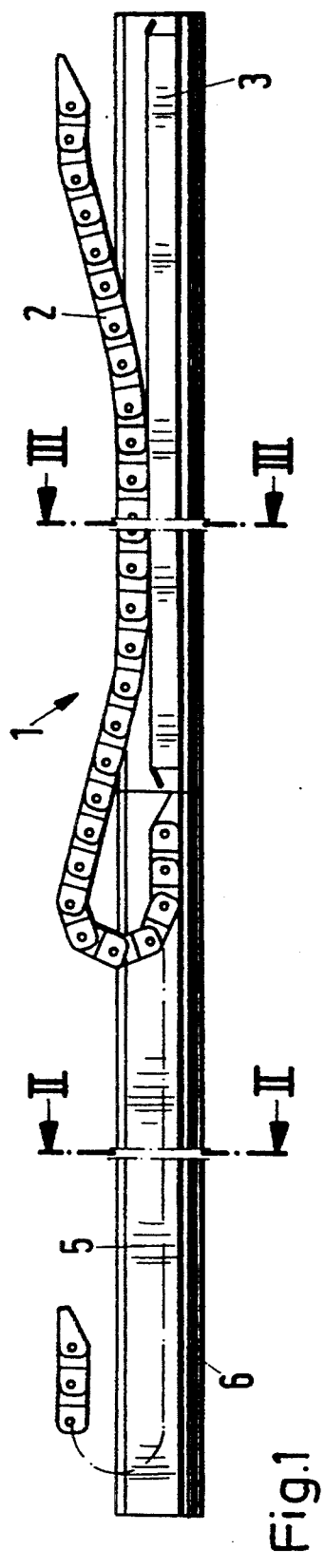
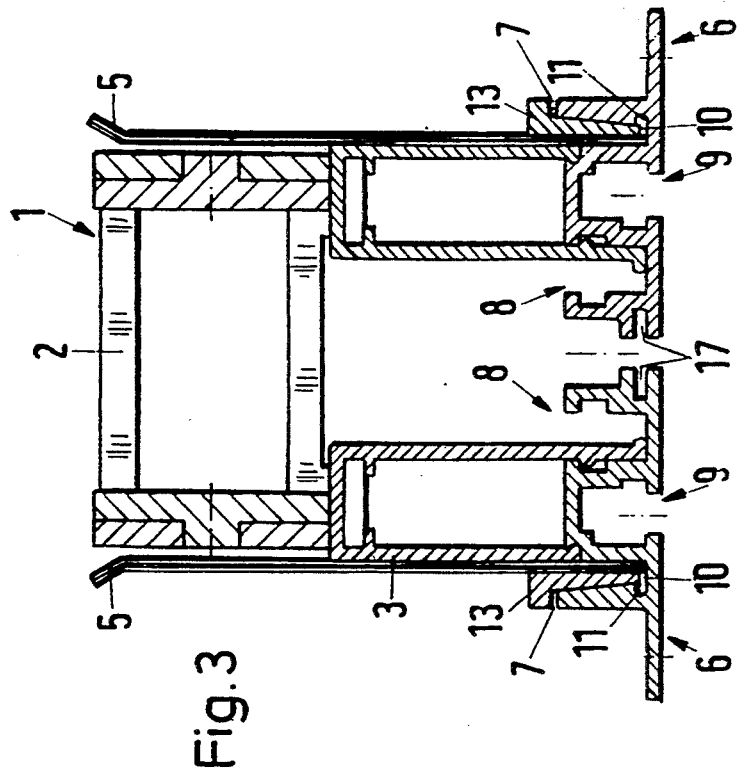
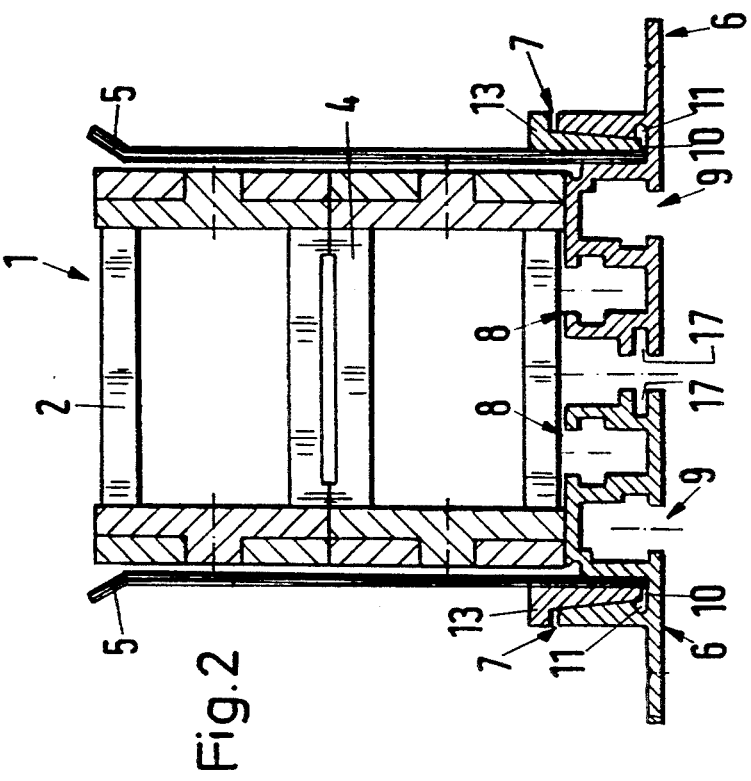

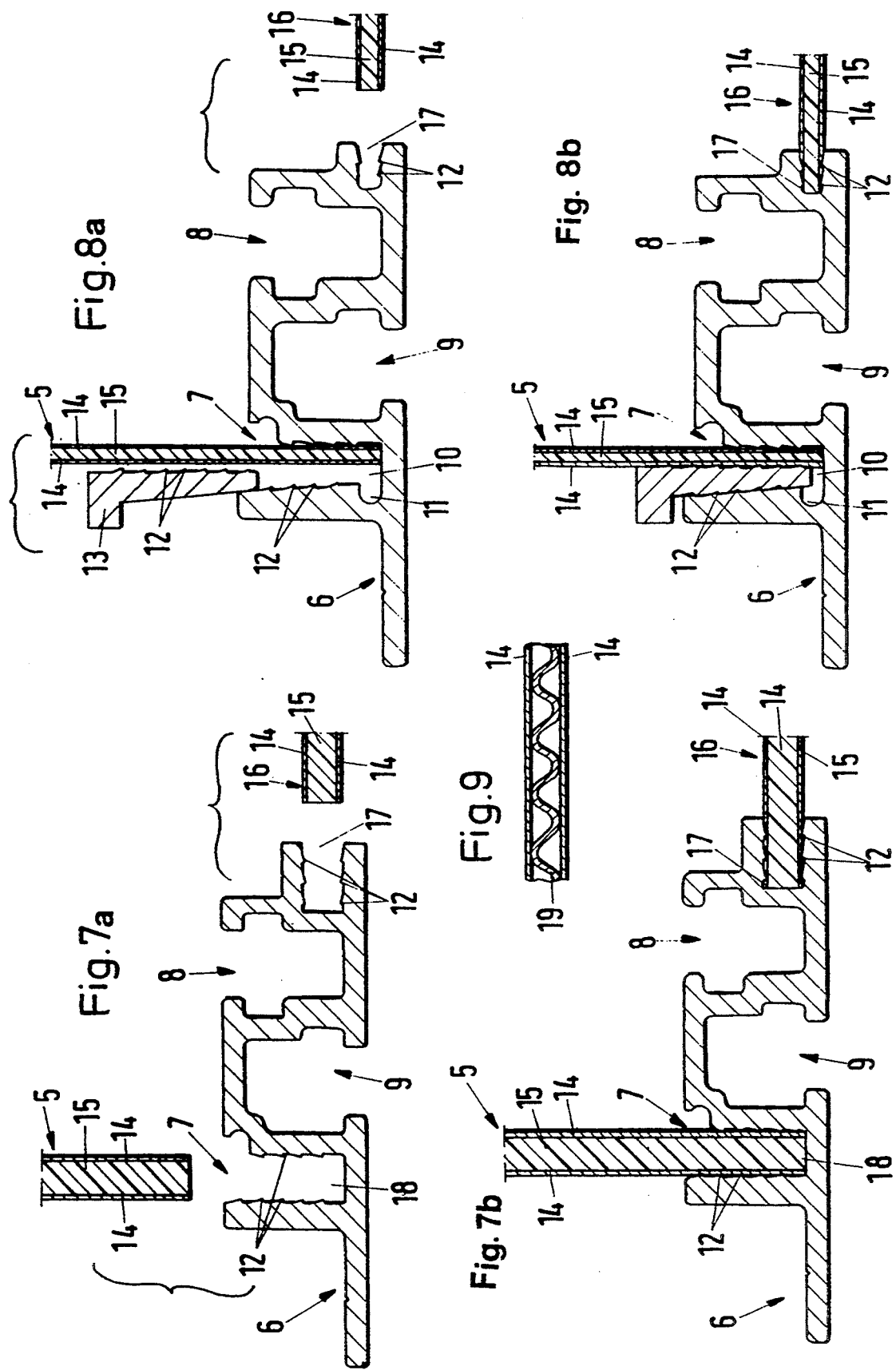

GUIDE CHANNEL FOR RECEIVING AND GUIDING GUIDE CHAINS FOR ENERGY LINES

BACKGROUND OF THE INVENTION

The present invention relates to a guide channel for receiving and guiding guide chains for energy lines, the guide channel having a bottom and two sidewalls.

In practice guide channels are known which are provided with a bottom and two sidewalls. These known guide channels provide for a guidance of guide chains for energy lines to be received therein; however, each guide chain for energy lines requires a particular guide channel because sidewalls and bottom are usually embodied as one unitary part. Furthermore, the manufacture of guide channels from steel or other metals results in a high weight of the guide channels and the generation of a high noise level when the guide chains for energy lines are moved within the guide channel.

From German patent 33 00 495 a guiding device for guiding guide chains of energy lines etc. is known and has an essentially H-shaped cross-section. With this known guiding device the individual sections of the guiding device can be adapted to various heights of guide chains to be received by rotating the individual sections 180° about their longitudinal axis and by inserting various intermediate pieces between the side portions. However, the adaptation of the guiding device to only two heights of guide chains is insufficient, and the mounting of the intermediate pieces and of the corresponding threaded pins is very cumbersome.

It is therefore an object of the present invention to provide a system of prefabricated parts for the assembly of a lightweight, noise-reducing, and easy to assemble guide channel for guiding guide chains for energy lines of various sizes.

BRIEF DESCRIPTION OF THE DRAWINGS

This object, and other objects and advantages of the present invention, will appear more clearly from the following specification in conjunction with the accompanying drawings, in which:

FIG. 1 is a side view of a guide channel, with the forward sidewall removed, with guide chains for energy lines received therein;

FIG. 2 shows the guide channel of FIG. 1 in a section along the line II—II;

FIG. 3 shows the guide channel of FIG. 1 in a section along the line III—III;

FIGS. 7a, 7b show an exploded (7a) and an assembled view (7b) of an embodiment according to FIGS. 5 and 6 in section;

FIGS. 8a, 8b shows an exploded (8a) and an assembled view (8b) of an embodiment according to FIGS. 2 and 3 in section; and FIG. 9 shows an enlarged detail of a sidewall or a bottom plate with a wave-shaped aluminum core in a sectional view.

SUMMARY OF THE INVENTION

The guide channel for receiving and guiding guide chains for energy lines of the present invention is primarily characterized by a bottom and two sidewalls, the sidewalls comprised of a composite material, the composite material including thin cover plates and an elastic core.

In a preferred embodiment, the bottom comprises lateral members having first grooves, with lateral portions of the first grooves having barbs, and with the sidewalls inserted into these first grooves. Expediently, the bottom further comprises a bottom plate comprised of the aforementioned composite material including thin cover plates and an elastic core. The bottom plate is inserted between two of the lateral members in a longitudinal direction of the lateral members. Preferably, the lateral members have second grooves in their longitudinal direction, the second grooves having lateral portions with barbs, with the bottom plate inserted into the second grooves.

The thin cover plates of the composite material are preferably made of aluminum and the elastic core of the composite material may be made of plastic material, for example, polyethylene, or aluminum in the form of a corrugated (wave-shaped) sheet.

A guide channel embodied according to the inventive technical solution has the advantage that the sidewalls and bottom plates can be assembled in a simple and fast manner and that the employed composite materials furthermore effect a noise and weight reduction.

DESCRIPTION OF PREFERRED EMBODIMENTS

The present invention will now be described in detail with the aid of several specific embodiments utilizing FIGS. 1 through 9.

Figure 4:
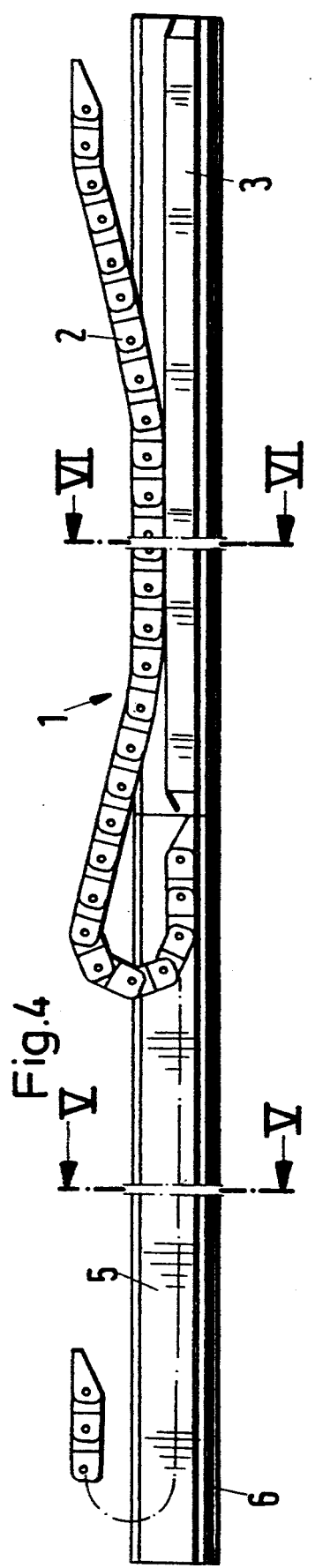
FIG. 4 is a side view of a further embodiment of a guide channel, with the forward sidewall removed, with guide chains for energy lines received therein.
Figure 6:
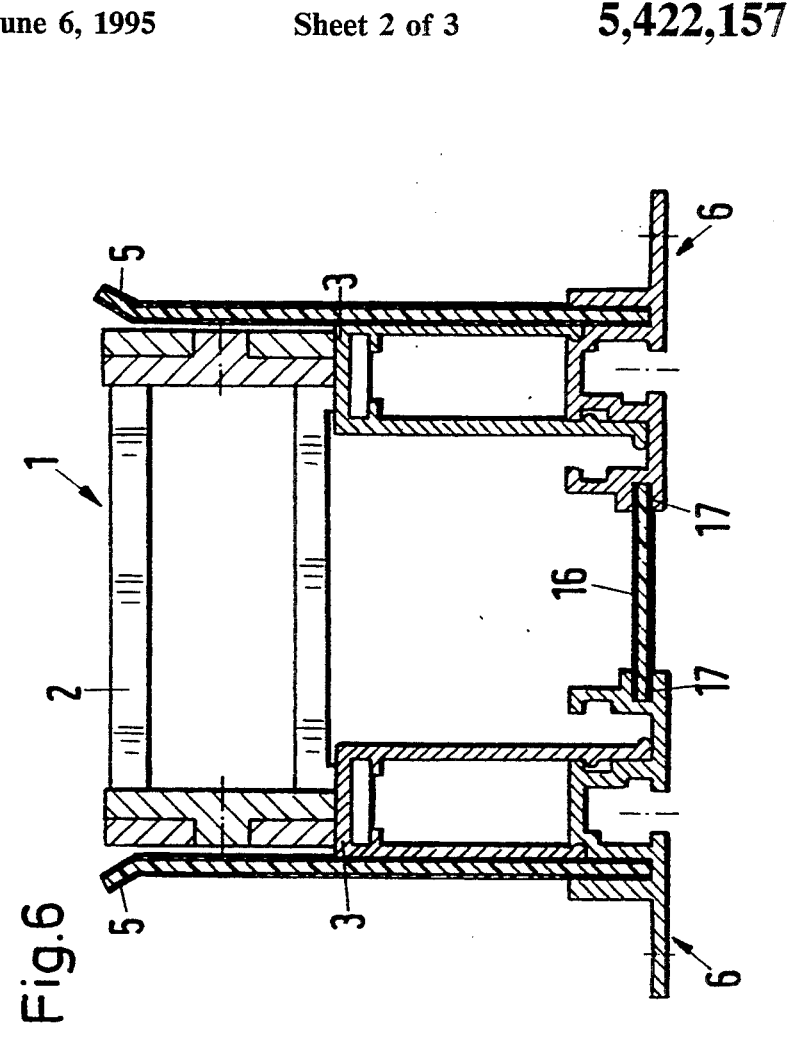
FIG. 6 shows the guide channel of FIG. 4 in a section along the line VI—VI.
Figure 5:
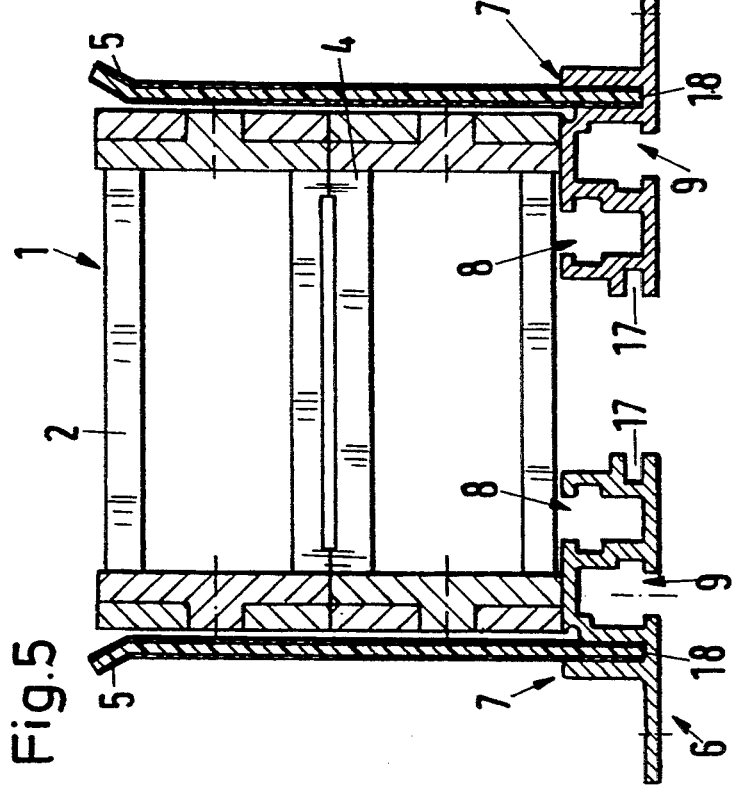
FIG. 5 shows the guide channel of FIG. 4 in a section along the line V—V.

The guide channel represented in FIGS. 1 and 4 contains a guide chain 1 for energy lines, the upper portion 2 of which is resting on a profiled support 3. FIGS. 2 and 3, respectively, 5 and 6 show different options of guiding a guide chain 1 for energy lines within a guide channel. In FIGS. 2 and 5, the upper portion 2 rests on the lower portion 4, and in FIGS. 3 and 6 the upper portion rests on the profiled support 3.

FIGS. 1 to 3 and FIG. 8 show a first embodiment of the inventive guide channel. The guide channel is comprised essentially of two sidewalls 5 and a bottom 6, 16, that is comprised of two parallel lateral members 6 and a bottom plate 16 that may be interposed between the lateral members 6. As can be seen especially in FIG. 8, the lateral members 6 are formed of a meander-shaped profiled part. This profiled part is comprised of three U-shaped profiles 7, 8, 9 which are arranged such that two U-shaped profiles 7, 8 open to the top and the other U-shape profile 9 is connected between the profiles 7 and 8 and opens to the bottom. As can be seen in FIG. 8, the U-shaped profile 7 which is designed to receive the sidewalls 5 is provided with a wedge-shaped groove 10. The inwardly oriented sidewall of the outer leg of the U-shaped profile is slanted in an outward direction and at its base is provided with a groove 11 that provides for an elastic movement of this leg. The lateral portions (sidewalls) of the groove 10 are provided with inwardly oriented barbs 12 which serve as a fixation means for the sidewalls 5 to be inserted.

In this first embodiment the sidewalls 5 are wedged within the groove 10 of the U-shaped profile 7 with the aid of wedges 13. The wedges 13 are also provided with barbs 12 at their face facing the sidewalls 5.

The sidewalls 5 to be inserted into the lateral members 6 are made of a composite material which is comprised of thin cover plates 14 and an interposed plastic core 15.

Two of the lateral members 6 can be connected by a bottom plate 16. The bottom plate 16 is inserted into a groove 17 of the U-shaped profile 8 which is also provided with inwardly oriented barbs 12.

In a second embodiment according to FIGS. 4 to 7, the U-shaped profile 7 for receiving the sidewalls 5 has a rectangular groove 18 which has barbs 12 provided at its lateral portions. The sidewalls 5 are inserted into this groove 18.

In an alternative embodiment of the invention according to FIG. 9, the sidewalls 5 and the bottom plate 16 are comprised of thin cover plates 14 and a corrugated aluminum core 19.

The use of sidewalls 5 made of a composite material substantially simplifies the insertion of the sidewalls 5 into the lateral members 6 of the bottom because the sidewalls 5 due to their elastic cores are compressible. The sidewalls 5 are therefore automatically wedged between the barbs 12 of the groove 18 or the barbs 12 of the groove 10 and the wedge 13. The use of the lateral members 6 with wedge-shaped grooves 10 furthermore provides for the insertion of sidewalls 5 of different widths because the fixation of the sidewalls 5 is achieved with the wedge 13.

The present invention is, of course, in no way restricted to the specific disclosure of the specification and drawings, but also encompasses any modifications within the scope of the appended claims.

What we claim is:

1. A guide channel for receiving and guiding guide chains for energy lines, said guide channel comprising:
   a bottom and two sidewalls mounted to said bottom, said sidewalls being comprised of a composite material, said composite material consisting of thin cover plates and an elastic core, said sidewalls being compressible due to said elastic core; and
   said bottom comprising lateral members having first grooves and said sidewalls being inserted into said first grooves.

2. A guide channel according to claim 1, wherein said first grooves comprise lateral portions having barbs.

3. A guide channel according to claim 2, wherein said bottom further comprises a bottom plate comprised of said composite material, said bottom plate being inserted between two of said lateral members in a longitudinal direction of said lateral members.

4. A guide channel according to claim 3, wherein said lateral members have second grooves in said longitudinal direction, said second grooves having lateral portions with barbs, with said bottom plate inserted into said second grooves.

5. A guide channel according to claim 3, wherein said thin cover plates of said composite material are made of aluminum and wherein said elastic core of said composite material is made of plastic material.

6. A guide channel according to claim 5, wherein said plastic material is polyethylene.

7. A guide channel according to claim 3, wherein said thin cover plates of said composite material are made of aluminum and wherein said elastic core of said composite material is made of aluminum in the form of a corrugated sheet.

* * * * *